UNITED STATES PATENT OFFICE.

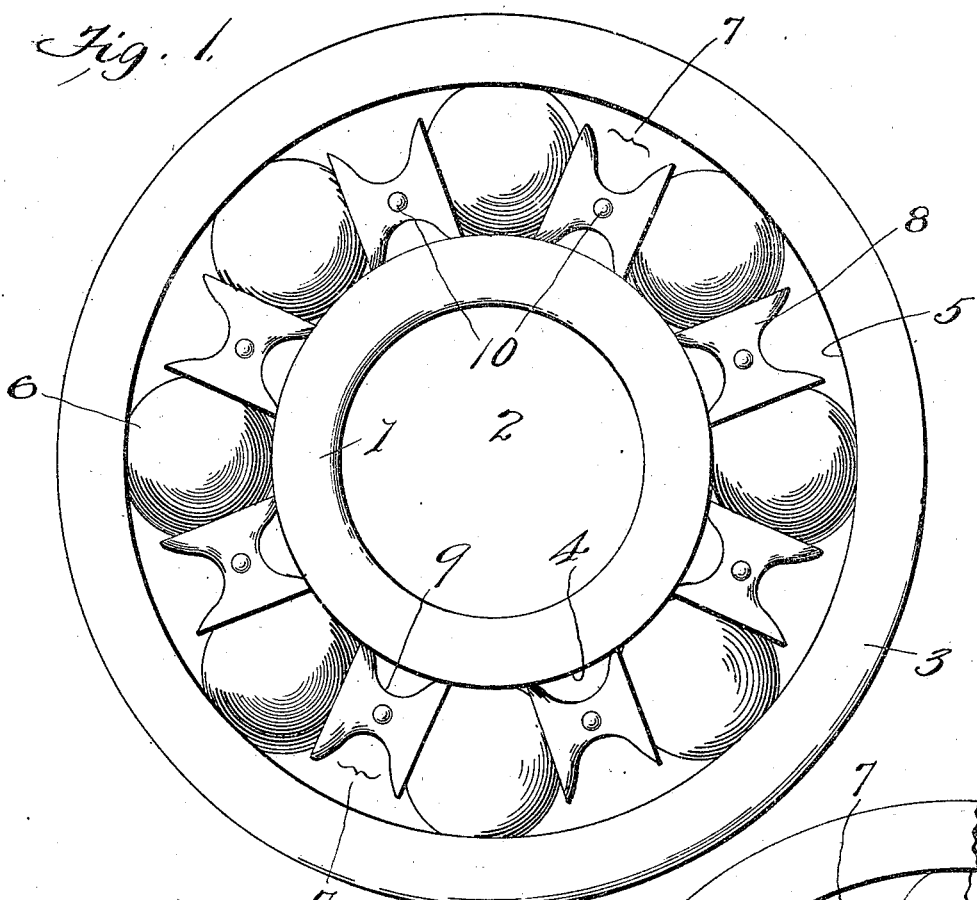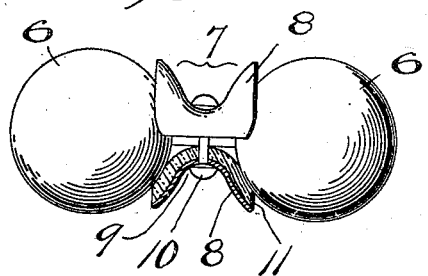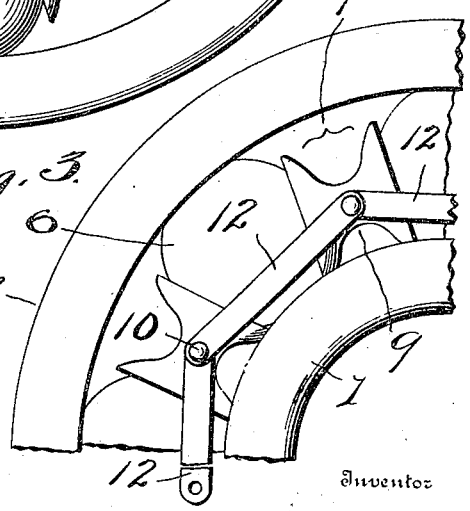

HENRY HESS, OF PHILADELPHIA, PENNSYLVANIA.

BALL-BEARING.

991,061. Specification of Letters Patent. Patented May 2, 1911.

Continuation of application Serial No. 265,385, filed June 15, 1905. This application filed February 28, 1907. Serial No. 359,792.

*To all whom it may concern:*

Be it known that I, HENRY HESS, a citizen of the United States, and a resident of Philadelphia, in the county of Philadelphia and State of Pennsylvania, have invented a new and useful Ball-Bearing, of which the following is a specification.

My invention relates to ball bearings.

It more particularly relates to bearings in which the balls are spaced apart from each other by separators. These bearings have many advantages well known in the art over the form in which the ball races are entirely filled with balls.

In bearings of the class described the axes of the inner and outer ball races are normally identical. In actual use, however, these axes may be more or less disalined, causing the balls at different portions of the races to move at different rates of speed. For this reason the separators between the balls have heretofore been made flexible, permitting such slight variations.

A principal object of my invention is to provide an improved separator, which is free from certain disadvantages of separators now in use, which takes up but little room in the races, is simple in structure, and provides the slight flexibility necessary in this class of bearing, by the use of a simple compressible member which at the same time may serve for the efficient lubrication of the bearing.

My invention will be hereinafter more fully described with reference to the accompanying drawing, which illustrates certain exemplifying structures in which the said invention is embodied, and in which:

Figure 1 is an end elevation of a ball bearing to which my invention is applied; Fig. 2 is a detail view, partly in section, of one form of my separator. Fig. 3 is a fragmentary view of a bearing in which links 12 are used to connect the separators 7.

Referring to Figs. 1 and 2, 1 is an inner bearing ring; 2, a bore in said ring by which the ring may be secured in any approved manner to an axle or shaft; 3, an outer bearing ring; 4, a ball race in ring 1; 5, a ball race in ring 3; 6, a series of balls intermediate the bearing rings and running in races 4 and 5; 7, the general designation of my separator; 8, side members of the same, two such side members being operatively connected to form one separator; 10, rivets passing through the constricted portions 9 of the separators and holding the two halves thereof together.

As assembled the separators have at either end a cup-shaped, or partly spherical, recess loosely embracing a segment of a ball. The shape of the separators is such that when the bearing is assembled they are self-retained in position, and will not become accidentally disengaged from the balls.

11 is a piece of felt or other compressible or elastic medium placed in each portion 8 of the separators, between the side pieces 8 and the balls, and retained by the rivets 10 which pass through them.

The flexible medium 11 is preferably of felt, and serves by reason of its slight compressibility to permit the variation in spacing of the balls which is desirable in this class of bearing, and at the same time serves as an excellent retainer of lubricant, which it carries in the most efficient manner in direct contact with the balls.

The separators as above described when assembled are self-retained in position, and need not be connected with each other. It is, however, desirable in certain cases to connect the separators. When they are connected the breakage of a ball will not be so liable to result in the falling out of the separators. In Fig. 3 is shown a way in which the separators may be connected.

12 are links each of which is secured at one end to one side of one of the separators by its rivet 10 and at the other end to the next separator in a similar manner, thus flexibly linking all of the separators together.

Reference is made to applicant's previous application Serial No. 265,385, filed June 15, 1905.

Having described my invention, what I claim is:

1. In a ball bearing the combination with two adjacent balls of a separator comprising a rigid sheet metal body having cup-shaped recesses presented toward the balls and an elastic substance placed in said recesses and engaging the balls and serving to form a yieldable medium between the rigid separator body and the balls.

2. In a ball bearing, the combination of two bearing rings having ball races, balls running therein, and separators intermediate adjacent balls, each separator having cup-shaped recesses accommodating segments of the balls and an elastic medium in each of the recesses between the separator and the ball.

3. The combination of two bearing rings having opposed ball races, balls running therein, and separators intermediate adjacent balls, each comprising a member adapted to surround a portion of each adjacent ball, and an elastic lubricant-carrying medium interposed between said separator and each adjacent ball.

4. In a ball bearing, in combination, a pair of bearing rings provided with races, a series of balls, a plurality of independent metallic double cup-shaped members, one interposed between each two adjacent balls with one of its cup-portions partly surrounding a ball, and a yielding medium carried in each cup-portion directly contacting with the ball, the cups being so formed as to allow the balls to lie relatively close to each other, and the combined compressibility of the yielding mediums allowing a great degree of relative movement of the balls in their plane of rotation.

5. The combination of two bearing rings having ball races, balls running therein, and separators, one interposed between each two adjacent balls, each separator having a rigid body and an elastic lubricant carrying medium between the body and each of the adjacent balls.

6. The combination of two bearing rings having ball races, balls running therein, and separators, one interposed between each two adjacent balls, each separator having a rigid body, an elastic lubricant carrying medium between the body and each of the adjacent balls, and links connecting the individual separators.

In testimony whereof I have affixed my signature in the presence of two witnesses.

HENRY HESS.

Witnesses:
MARY M'CALLA,
THEO. H. M'CALLA.